United States Patent [19]
Bengtsson et al.

[11] Patent Number: 5,904,813
[45] Date of Patent: May 18, 1999

[54] PRESS ROLL WITH JACKET EDGE CLAMPING RING

[75] Inventors: Roland Bengtsson; Lars Gustavsson, both of Karlstad; Carl-Gustaf Salomonsson, Fagerås; Nils-Erik Säfman; Kenth Törnqvist, both of Karlstad, all of Sweden

[73] Assignee: Valmet-Karlstad AB, Karlstad, Australia

[21] Appl. No.: 08/953,176

[22] Filed: Oct. 17, 1997

Related U.S. Application Data

[60] Provisional application No. 60/033,356, Dec. 18, 1996.

[30] Foreign Application Priority Data

Oct. 18, 1996 [SE] Sweden ................................. 9603833

[51] Int. Cl.[6] ........................................................ D21F 3/08
[52] U.S. Cl. .......................... 162/358.3; 162/272; 492/22
[58] Field of Search ................................ 162/272, 358.3, 162/361; 492/47, 22, 26

[56] References Cited

U.S. PATENT DOCUMENTS

| | | | |
|---|---|---|---|
| 4,625,376 | 12/1986 | Schiel et al. ................................. | 492/22 |
| 5,011,578 | 4/1991 | Lange et al. ............................ | 162/358.3 |
| 5,098,523 | 3/1992 | Ilmarinen et al. ..................... | 162/358.3 |
| 5,556,514 | 9/1996 | Didier .................................. | 162/358.3 |

FOREIGN PATENT DOCUMENTS 90120   9/1993   Finland .

*Primary Examiner*—Karen M. Hastings
*Attorney, Agent, or Firm*—Alston & Bird, LLP

[57] ABSTRACT

A press roll intended, together with a press shoe, to cooperate with a counter roll to form a press with long nip for paper or board machines, said press roll comprising two end walls, a jacket, the edge portions of which are secured by an elastic clamping ring to peripheral parts of the end walls, a form-stable clamping ring being screwed to the inner side of the end-wall part to clamp the outwardly expandable elastic clamping ring so that the edge portion of the jacket is clamped firmly against a counter-support member. According to the invention each end wall includes guide means to provide a guided engagement relationship between the form-stable clamping ring and the end-wall part. The guide means includes one axially concentric guide groove in the form-stable clamping ring and an axial, concentric guide flange in the end-wall part for cooperation with the guide groove, the guide groove defining radially externally a radial clamping surface disposed opposite a corresponding clamping surface of the end-wall part for cooperating clamping of the elastic clamping ring.

18 Claims, 6 Drawing Sheets

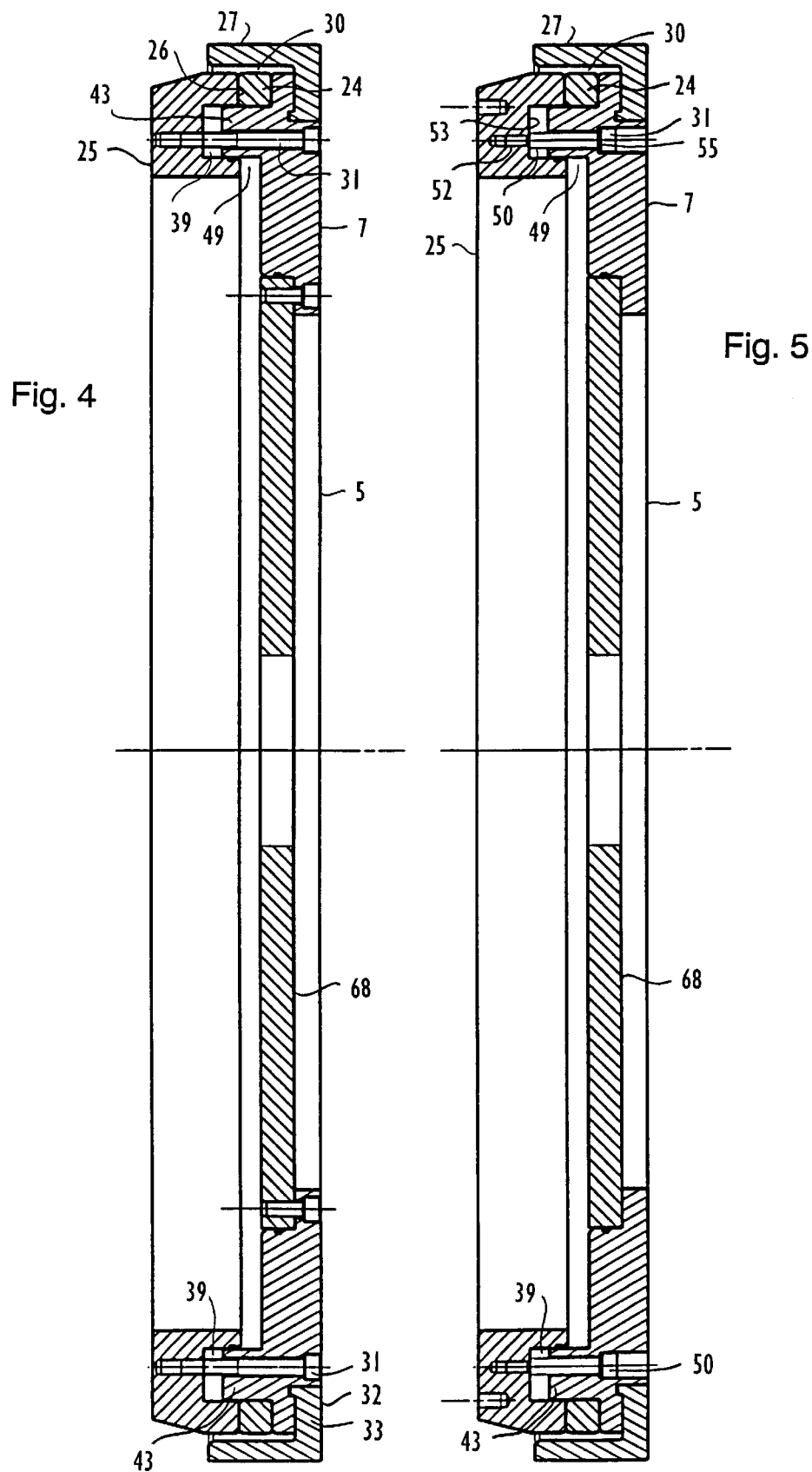

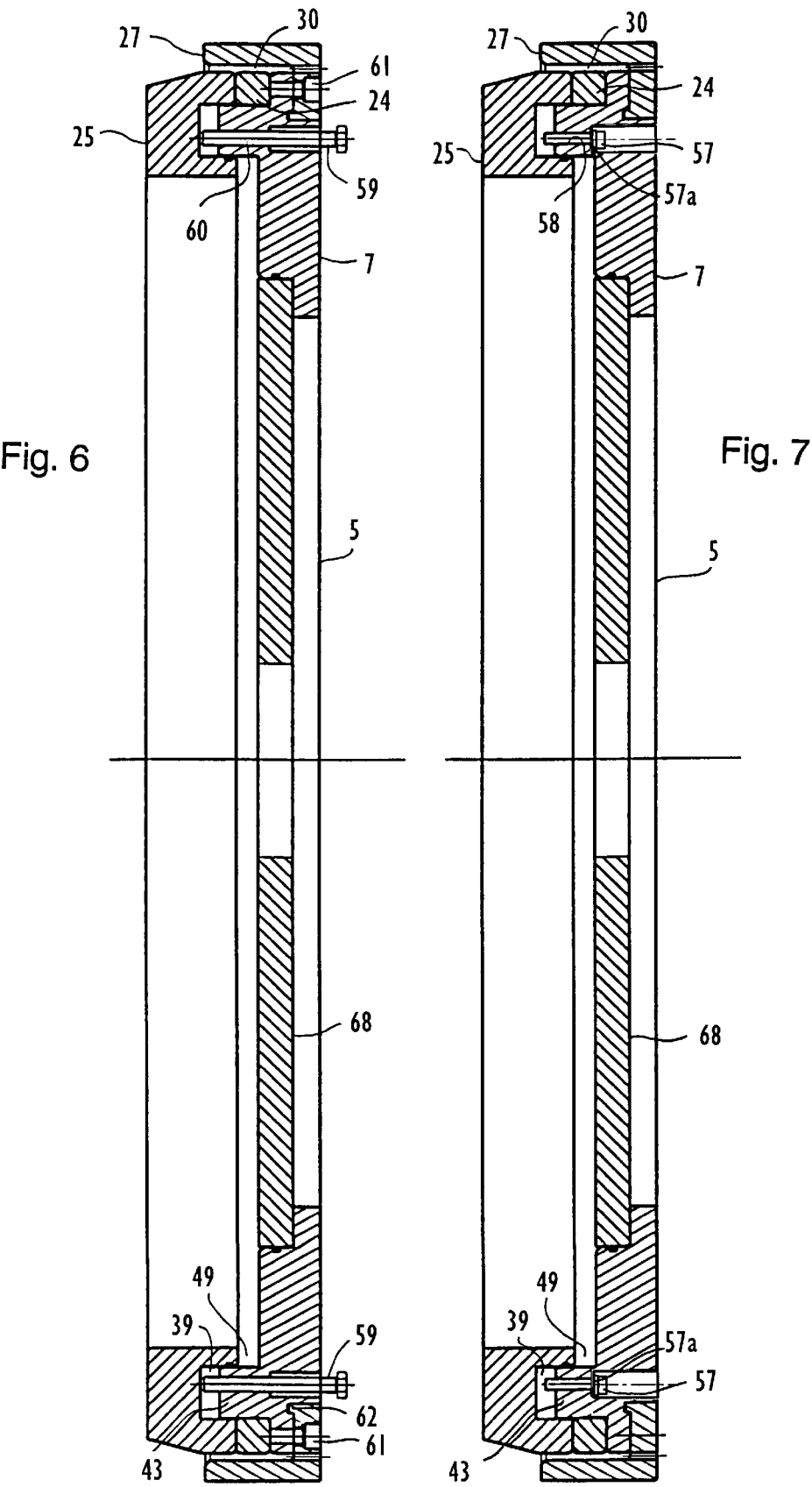

PRESS ROLL WITH JACKET EDGE CLAMPING RING

CROSS-REFERENCE TO RELATED APPLICATIONS

This application claims the benefit of U.S. Provisional Application No. 60/033,356 filed Dec. 18, 1996.

FIELD OF THE INVENTION

The present invention relates to press rolls for paper or board machines, and more particularly relates to press rolls having a flexible outer jacket.

BACKGROUND OF THE INVENTION

U.S. Pat. No. 5,098,523 describes a press roll, the jacket of which is secured to the end walls by means of circle-arc, wedge-shaped locking elements that are pulled into circular, axial grooves on the inner sides of the end walls, thereby clamping the edge portions of the jacket. This known arrangement effectively locks the jacket to the end walls. However, it has been found that repeated assembly and dismantling of the jacket causes the edge portions to stretch since the wedge-shaped locking element must be moved axially under increasing clamping action against the jacket. Furthermore, the locking element acts on the outside of the jacket so that the jacket is compressed radially inwardly and no compensation therefor occurs for any over-dimensioning of the jacket. This results in outward bending of the jacket. In view of these drawbacks it is difficult to achieve an accurate fit of the jacket while this work is in progress and assembly of the jacket may have to be discontinued and recommenced from the beginning.

The problems described above are eliminated with a press roll according to FI-90120 in which the jacket is clamped against a counter-support ring by means of an elastic clamping ring, the elastic clamping ring being compressed between an outer or inner clamping ring of metal and the peripheral portion of the end wall. One drawback with the arrangement according to FI-90120 is that it is difficult to achieve accurate fitting of the various elements in relation to each other quickly and simply, and at the same time ensure sufficient clamping force around the whole jacket.

The object of the present invention is to provide a press roll that at least essentially reduces the problems of the latter known press roll.

SUMMARY OF THE INVENTION

The press roll according to the invention comprises two end walls, a tubular, flexible, liquid-impervious jacket, secured at its edge portions by an elastic clamping ring to peripheral parts of the end walls, and stationary support means for supporting the end walls. The end walls include bearing means arranged to permit rotation of the jacket and a section of each end wall is disposed radially outside the bearing means, in relation to the stationary support means. The press roll also includes a press shoe forming together with a counter roll a pressure zone with long nip through which the jacket is moved in sliding contact with the press shoe. A form-stable clamping ring is screwed to the inner side of the end-wall part by means of a plurality of clamping bolts to clamp the radially outwardly expandable elastic clamping ring so that the edge portion of the jacket is clamped firmly against a counter-support member disposed radially outside the elastic ring.

Advantageously, each end wall comprises guide means to provide a guided engagement relationship between the form-stable clamping ring and the end-wall part. The guide means comprises at least one axially concentric guide groove in the form-stable clamping ring and at least one axial, concentric guide flange in the end-wall part, for sliding cooperation with the axially opposite guide groove. The guide groove defines radially externally a radial clamping surface disposed opposite a corresponding clamping surface of the end-wall part for cooperating clamping of the elastic clamping ring.

According to another aspect of the invention, each end wall comprises a plurality of distance elements which are placed at least partially between the form-stable clamping ring and the end-wall part in order to define a least axial distance between the form-stable clamping ring and the end-wall part.

BRIEF DESCRIPTION OF THE DRAWINGS

The invention will be described in more detail in the following with reference to the drawings.

FIGS. 4–7 are different sectional views along the lines A—A, B—B, C—C and D—D, respectively, in FIG. 2.

DETAILED DESCRIPTION OF THE PREFERRED EMBODIMENTS

Figure 1:
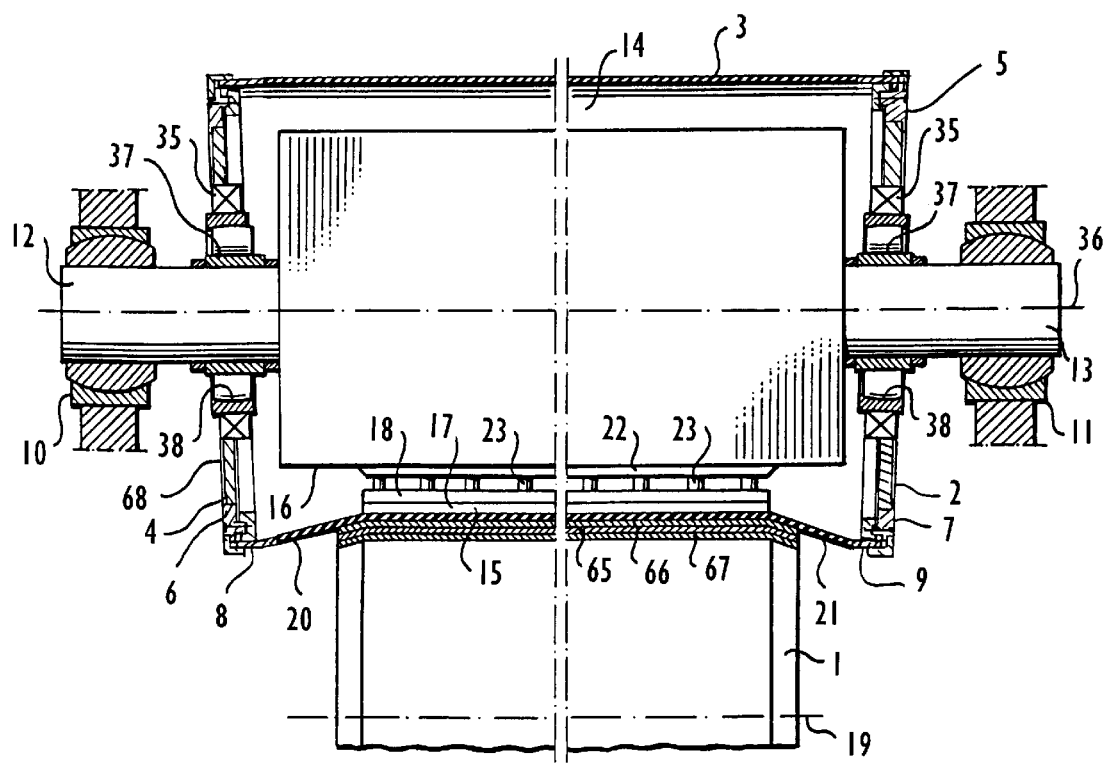
FIG. 1 shows schematically parts of a wet press having a press roll with end walls in accordance with the invention.
Figure 2:
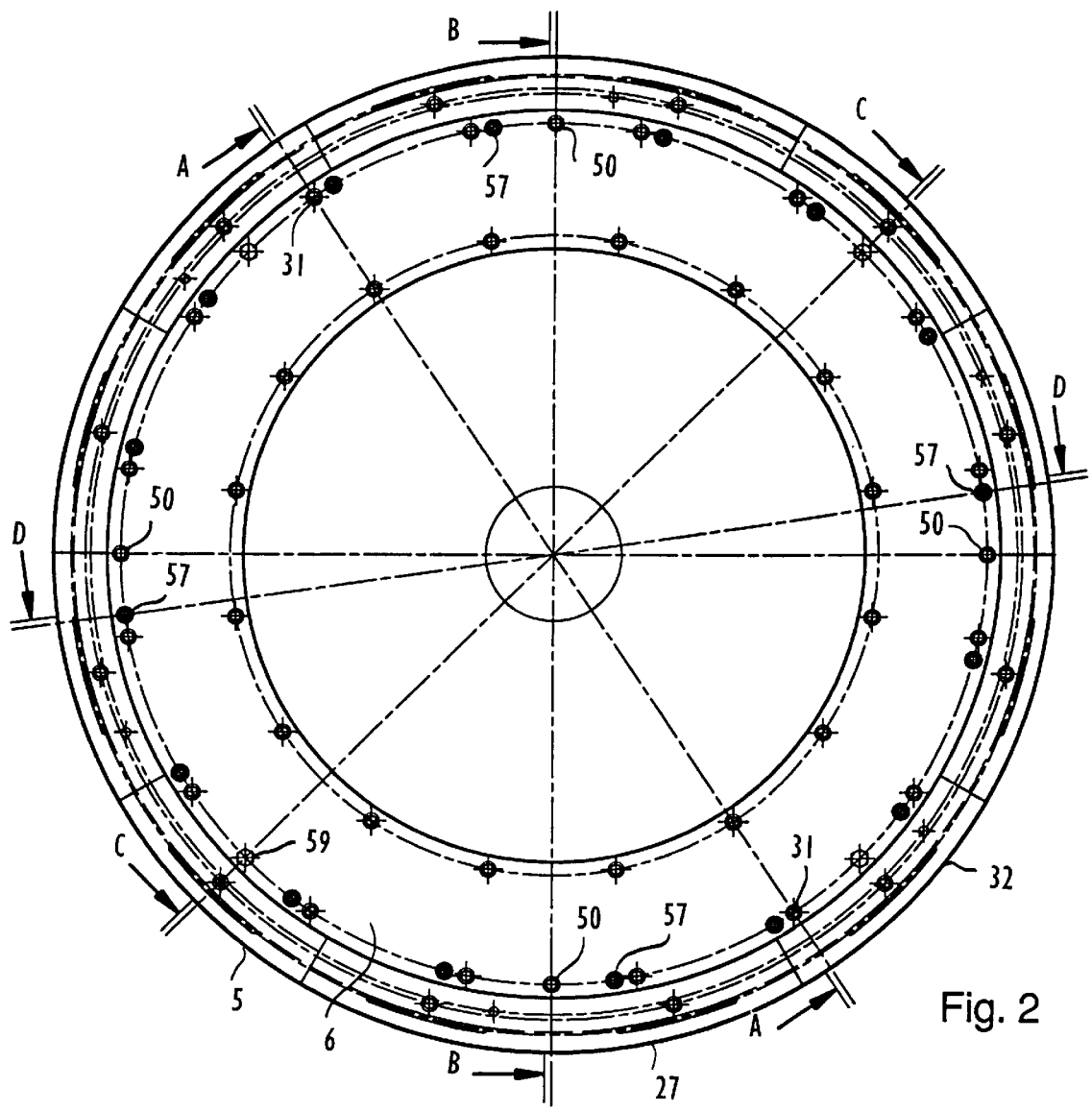
FIG. 2 is a side view of the end wall as shown in FIG. 1.
Figure 3:
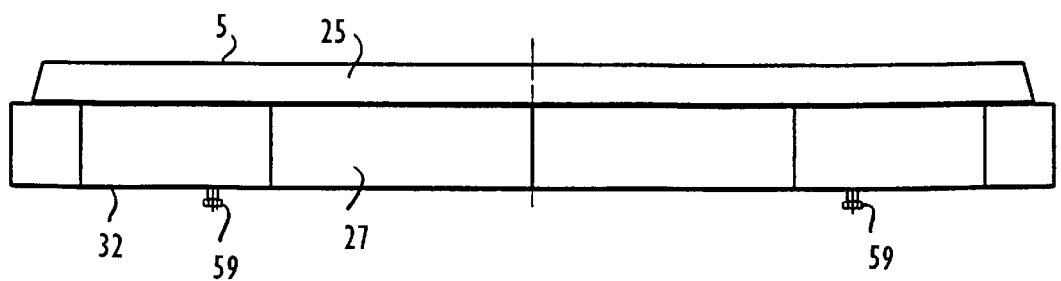
FIG. 3 is an elevation view from above of the end walls as shown in FIG. 2.
Figure 8:
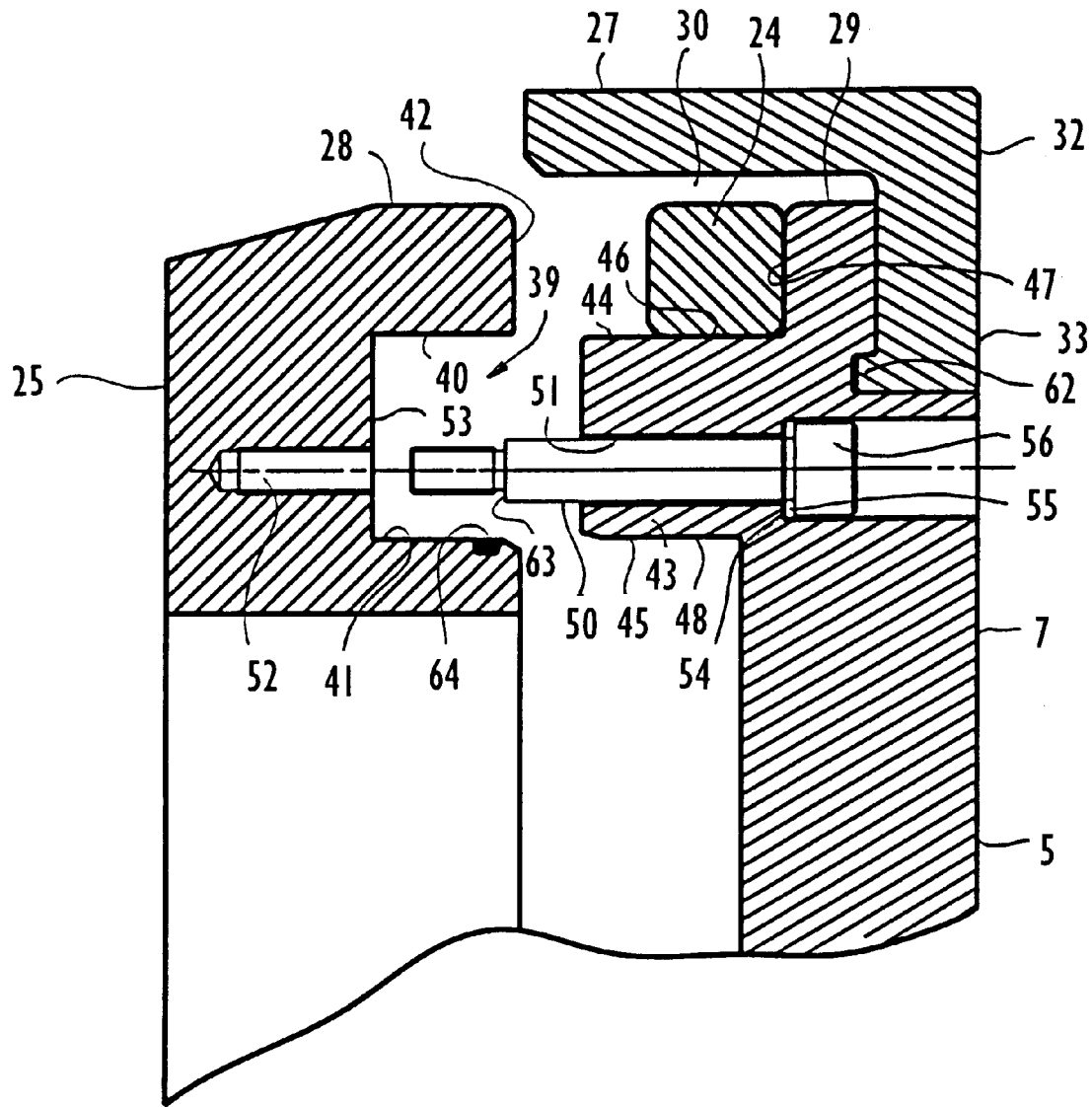
FIG. 8 shows a portion of the end wall shown in FIG. 5 before a form-stable clamping ring has been brought into abutment against a peripheral part of the end wall.

With reference to FIG. 1 this shows schematically parts of a wet press disposed in the wet section of a paper machine or board machine in order to press water out of and consolidate a formed wet fibrous web 65.

The wet press comprises a rotatable counter roll 1 and a press roll 2 having a tubular, liquid-impervious jacket 3 of flexible material such as plastic or rubber, and two opposing circular end walls 4, 5, at the peripheral parts 6, 7 of which the edge portions 8 and 9, respectively, of the jacket are air-tightly and liquid-tightly joined by means of an endless, elastic, clamping ring 24 consisting of suitable rubber material or rubber-like material. The elastic clamping ring 24 suitably has rectangular, preferably quadratic cross section.

The press roll is mounted in two stand parts 10, 11 by means of support means in the form of two stationary support pins 12, 13 with circular cross section, extending in air-tight and liquid-tight manner through central openings in the end walls 4, 5. The end walls 4, 5, jacket 3 and support pins 12, 13 thus enclose an air and liquid-tight chamber 14 which can be placed under sufficient pressure, e.g. 0.5 bar overpressure, so that the end walls 4, 5 are moved apart from each other to keep the jacket 3 sufficiently taut. The end walls 4, 5 are consequently axially displaceable in relation to the support pins 12, 13. Alternatively a spring means can be arranged in the press roll, which presses against the end walls or against one of them to stretch the jacket in the axial direction. Pneumatic or hydraulic cylinders may also be used for this purpose, or any suitable combination of these arrangements.

The press roll 2 also includes a press shoe 15 disposed opposite the counter roll 1, the press shoe and counter roll together forming a pressure zone with long nip within a predetermined sector of the counter roll 1 where the jacket 3 is thus pressed down against the press shoe 15 and runs around the counter roll 1. The press shoe 15 is supported by an inner stand 16 rigidly mounted to the inner parts of the support pins 12, 13.

The fibrous web to be dewatered is enclosed between two felts 66, 67, each disposed to run in a loop over a plurality of drums (not shown) and through said pressure zone. During operation the continuous wet fibrous web 65 runs through the pressure zone together with the felts 66, 67 which absorb liquid pressed out of the fibrous web.

The press shoe 15 shown consists of a sliding part 17 and a frame part 18, the sliding part 17 having a sliding surface along which the jacket 3 moves in sliding contact. The press shoe 15 located opposite the counter roll 1 extends across the jacket 3 parallel to the axis of rotation 19 of the counter roll 1 and has a length equivalent to or slightly less than the length of the counter roll 1, which in turn is shorter than the press roll 2 so that between the end walls 4, 5 and counter roll 1, within the area of the pressure zone, inclined sections 20, 21 of the jacket 3 are formed outside the counter roll. In the preferred embodiment shown the press shoe 15 is connected to the stand 16 via a jack unit 22 having several jacks 23 by means of which the pressure of the press shoe 15 onto the jacket 3 and fibrous web can be regulated. A channel system (not shown) is also arranged in the press shoe 15 for the supply of lubricant to the sliding surface of the sliding part 17 to form and maintain a friction-reducing film between the jacket 3 and press shoe 15. The press shoe 15 may be provided with hydrostatic pressure pockets (not shown) filled with pressure fluid acting against the inside of the jacket 3 to compress the fibrous web in a controlled manner.

The end walls 4, 5 have circular bearing means 35 for rotation of the jacket and the section 68 of each end wall located radially outside the bearing means 35 about an axis of rotation 36, in which section 68 the peripheral end-wall part 6, 7, respectively, is thus included together with a central part to which the peripheral end-wall part is screwed by means of bolts (see FIG. 4). The end wall section 68 is form-stable and consists of a suitable metal material. In the embodiment according to FIG. 1 the bearing means 35 consist of rolling bearings such as ball bearings or roller bearings. Alternatively, slide bearings with flat or spherical sliding surfaces may be used. Each end wall 4, 5 also comprises cylindrical slide bearings 37 disposed so that the end wall can be displaced axially in relation to the support pins 12, 13. Alternatively, only one end wall is provided with such a slide bearing 37 in order to effect axial displacement of the end wall.

The end walls 4, 5 also comprise means 38 concentric with the axis of rotation 36 and disposed so that the peripheral end-wall parts 6, 7 can be moved freely axially towards each other and towards the press shoe 15 or nip region due to the influence of the axial stresses that occur in the jacket 3 upon its passage through the pressure zone. The peripheral parts 6, 7 of the end walls can be drawn inwardly and inclined in the nip region with a small angle of about 0.5°. The local axial stresses can thus be greatly reduced. The stress-reducing means 38 may consist of spherical bearings as shown, or of built-in elastic rings or sections of the end walls. The invention may, however, be applied on press rolls that are not provided with such stress-reducing means 38.

Since the jacket is secured by its parallel edge portions to the end walls, more specifically to their peripheral end-wall parts 6, 7, and the concentric means 38 are arranged to permit free axial displacement of the peripheral end-wall parts 6, 7 inwardly within the pressure zone due to the influence of said axial stresses in the jacket 3, the end walls 4, 5 will consequently be inclined in a self-adjusting manner throughout operation.

Figure 9:
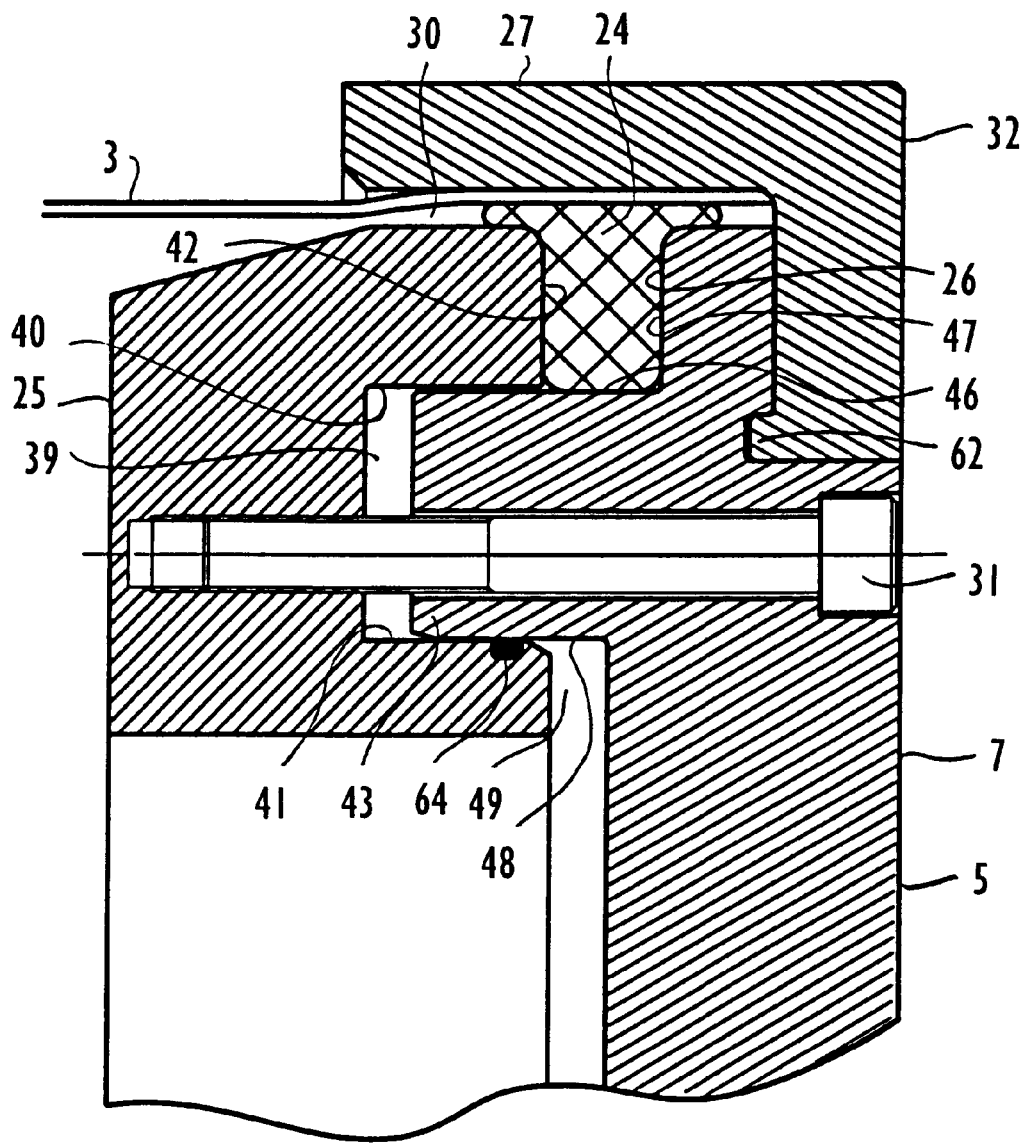
FIG. 9 shows a portion of the end wall shown in FIG. 4 after the clamping bolts in the end wall have been screwed in, causing expansion of the elastic clamping ring and securing the jacket.

An endless, form-stable clamping ring 25 is arranged on the inside of each end wall 4, 5 to form a radially outwardly open groove 26 between itself and the peripheral end-wall part 6, 7, to receive said elastic clamping ring 24. A counter-support member 27 is arranged radially outside the elastic clamping ring 24 to form an axially inwardly open concentric gap 30 between itself and opposite cylindrical surfaces of the form-stable clamping ring 25 and the peripheral end-wall part 6, 7, to receive the edge portion 8, 9 of the jacket 3, initially with slight clearance. With the aid of a plurality of axial clamping bolts 31 distributed uniformly around the circumference, the form-stable clamping ring 25 is drawn towards the peripheral end-wall part 6, 7 to compress the elastic clamping ring 24 so that it expands radially outwards and firmly clamps the edge portion 8, 9 of the jacket 3 between itself and said counter-support member 27, as shown more clearly in FIG. 9. In the embodiment shown, the counter-support member 27 is formed by one shank of a segmented L-shaped ring 32, the other shank 33 of the ring 32 being screwed to the peripheral end-wall part 6, 7 by means of bolts 61 (see FIG. 6). The shank 33 has an axial boss 62 which rests in a corresponding axial groove in the peripheral end-wall part 6, 7 to absorb the momentary stress arising when the jacket 3 is pressed against the outer shank 27.

Each end wall 4, 5 comprises guide means to ensure exact assembly of the form-stable clamping ring 25 on the peripheral end-wall part 6, 7 so that these elements are not inclined in relation to each other, but retain their parallel, concentric positions throughout the assembly work. In the embodiment shown the guide means comprises an axially concentric guide groove 39 (see FIGS. 4–9), designed in the form-stable clamping ring 25 on the side facing the end-wall part 6, 7 and having opposing cylindrical guide surfaces 40, 41 and a predetermined depth. The guide groove 39 defines radially externally an axially inner clamping surface 42 for cooperation with the elastic clamping ring 24.

The guide means also comprise an axial, concentric guide flange 43 designed in the peripheral end-wall part 6, 7 on the side facing the form-stable clamping ring 25 opposite said guide groove 39 and having cylindrical guide surfaces 44, 45 facing away from each other for cooperation with the guide surfaces 40, 41 of the guide groove 39. The radially outer guide surface 44 of the guide flange 43 continues into a counter-support surface 46 for the elastic clamping ring 24. An axially outer clamping surface 47 extends at right angles to the counter-support surface 46 for cooperation with the elastic clamping ring 24, said clamping surface 47 thus being located opposite the clamping surface 42 of the form-stable clamping ring 25. The radially inner guide surface 45 of the guide flange 43 continues into the distance surface 48 so that a gap 49 always exists between the peripheral end-wall part 6, 7 and the form-stable clamping ring 25.

The guide means also comprise a plurality of guide bolts 50 distributed uniformly around the circumference, each extending through an axial, unthreaded hole 51 in the peripheral end-wall part 6, 7 within the region of the guide flange 43, to an axially threaded hole 52 in the bottom 53 of the guide groove 39 in the form-stable clamping ring 25. The guide bolt 50 is screwed into the threaded hole 52 until a stop against further turning is obtained. In the embodiment shown the turning stop is formed by a shoulder 63 on the guide bolt 50 behind its threaded portion for cooperating with the bottom surface 53 of the guide groove 39. The guide bolt 50 has no influence on the elastic clamping ring 24. The length of the guide bolt 50 and the location of the edge 54 of the entrance to the hole are therefore so adjusted to each other that a small gap 55 is formed between the head 56 of the guide bolt 50 and the edge 54 of the hole when the clamping surface 42 of the form-stable clamping ring 25 is in contact with the elastic clamping ring 24 without clamping action. Under the stated conditions, this gap 55 is about 1–5 mm.

The distance between the head 56 of the guide bolt 50 and the edge 54 of the hole increases then when the elastic clamping ring 24 is compressed by the clamping bolts 31. However, the defined gap 55 is smaller than the part of the guide flange 43 disposed in the guide groove 39 in the stated condition, i.e. when the clamping surface 42 is in clamp-free contact with the elastic clamping ring 24. The edge 54 of the hole is recessed so that the head 56 of the guide bolt 50 is always located in the recess, which is suitably closed to prevent the guide bolt 50 that has been screwed to the turning-stop, from being unintentionally loosened and released from the form-stable clamping ring 25.

Together with said edges 54 of the holes, the guide bolts 50 act as mechanical stops to retain the form-stable clamping ring 25 in its guided engagement with the peripheral end-wall part 6, 7 via the guide groove 39 and guide flange 43 when the clamping bolts 31 have been loosened to dismantle the jacket 3. This is valuable from the safety aspect, as well as the form-stable clamping ring 25 being retained in a starting position to permit direct assembly of a new jacket or re-tensioning of the existing jacket. When the clamping bolts 31 are screwed in, the form-stable clamping ring 25 is guided by the guide means to an exact position in relation to the peripheral end-wall parts 6, 7.

The elastic clamping ring 24 also forms an effective seal. An additional seal in the form of an O-ring 64 is arranged at the inner groove 39.

Each end wall 4, 5 comprises a plurality of distance elements or spacers placed between the form-stable clamping ring 25 and the end-wall part 6, 7 in order to determine or define a least axial distance between the form-stable clamping ring 25 and the end-wall part. Such distance elements are rigid or incompressible. In the embodiment shown, the distance elements comprise a plurality of stop bolts 57 distributed uniformly around the circumference and screwed into axial, threaded holes 58 in the peripheral end-wall part 6, 7, their free ends to be brought into contact with the bottom surface 53 of the guide groove 39 when the elastic clamping ring 24 has been compressed sufficiently to secure the jacket 3 to the end wall 4, 5. The stop bolts 57 in a given installation have the same length of the part that protrudes out of the guide flange 43, this length being predetermined in order to guarantee that the jacket 3 is sufficiently secured at all points around its circumference. Variable pressure forces from the elastic clamping ring 24 against the jacket 3 can be obtained with the aid of the stop bolts 57 or other distance elements, via the clamping bolts 31 and the form-stable clamping ring 25, as well as compensation for different thickness of the jacket 3. The stroke length of the stop bolt 57 can be varied with the aid of spacing washers 57a having different thicknesses for application on the stop bolt 57.

A plurality of dismantling bolts 59 distributed uniformly around the circumference are screwed into axial, threaded holes 60 in the peripheral end-wall part 6, 7 to an inoperative starting position. When dismantling the jacket 3 the dismantling bolts 59 are screwed further in so that their free ends cooperate with the bottom surface 53 of the guide groove 39 in order to loosen the form-stable clamping ring 25 and displace it away from the peripheral end-wall part 6, 7, particularly when these elements have become locked or wedged together.

Alternatively the guide means may comprise several, e.g. two, guide grooves and a corresponding number of guide flanges.

That which is claimed is:

1. A press roll for an extended nip press in a papermaking machine, said press roll comprising:

at least one central support shaft;

a tubular flexible jacket, said jacket having a liquid-impervious outer surface and a pair of opposed edge portions;

a pair of end walls supported on said shaft, each of said end walls having a guide flange concentric with said shaft;

a counter-support member connected to a peripherally outer portion of each of said end walls;

an elastic clamping ring supported on each of said end walls in a position radially spaced from the respective counter-support member, each of said opposed edge portions of said jacket being positioned between a respective elastic clamping ring and counter-support member;

a substantially rigid form-stable clamping ring adjacent to each of said elastic clamping rings, said clamping ring defining a guide groove having interior dimensions corresponding to the outer dimensions of said guide flange; and a plurality of securing members for urging each form-stable clamping ring into clamping engagement with the respective end wall such that said elastic clamping ring is deformed and securely engages the edge portion of said jacket against the respective counter-support member, said guide flange and corresponding guide groove cooperating to guide said form-stable clamping ring and said end wall into a radially and axially aligned relationship when clamped together.

2. A press roll as claimed in claim 1 further comprising a plurality of guide bolts each having a head and a shank, said head being adjacent to said end wall and said shank extending through said end wall and being secured to said form-stable clamping ring such that said form-stable clamping ring is retained adjacent to said elastic clamping ring when said securing members are loosened.

3. A press roll as claimed in claim 2 wherein said guide bolts have a length such that said head and said end wall define a gap therebetween when said form-stable clamping ring and said end wall are clamped together by said securing members.

4. A press roll as claimed in claim 2 wherein said guide bolts have a length such that said guide flange and said guide groove remain in engagement when said securing members are loosened.

5. A press roll as claimed in claim 3 wherein said gap is about 1–5 mm.

6. A press roll as claimed in claim 1 wherein said securing members comprise clamping bolts extending through said end wall and threadably engaging said form-stable clamping ring.

7. A press roll as claimed in claim 1 further comprising a plurality of stop bolts each secured to said end wall and having an end adjacent to said form-stable clamping ring, the end of each stop bolt engaging the form-stable clamping ring and stopping further deformation of said elastic clamping ring when said form-stable clamping ring is urged against the respective end wall to a predetermined degree.

8. A press roll as claimed in claim 7 further comprising spacing washers for adjusting the position of the ends of said stop bolts.

9. A press roll as claimed in claim 1 further comprising a plurality of dismantling bolts threadably engaged in said end wall and having a length such that said form-stable clamping ring can be displaced away from said end wall when said securing members are loosened and said dismantling bolts are advanced toward said form-stable clamping ring.

10. A press roll for an extended nip press in a papermaking machine, said press roll comprising:

at least one central support shaft;

a tubular flexible jacket, said jacket having a liquid-impervious outer surface and a pair of opposed edge portions;

a pair of end walls supported on said shaft, each of said end walls having a guide flange concentric with said shaft, said guide flange defining radially inner and outer cylindrical guide surfaces;

a counter-support member connected to a peripherally outer portion of each of said end walls;

an elastic clamping ring supported on each of said end walls in a position radially spaced from the respective counter-support member, each of said opposed edge portions of said jacket being positioned between a respective elastic clamping ring and counter-support member;

a substantially rigid form-stable clamping ring adjacent to each of said elastic clamping rings, said clamping ring defining a guide groove having radially inner and outer cylindrical guide surfaces corresponding to the guide surfaces of said guide flange; and a plurality of securing members for urging each form-stable clamping ring into clamping engagement with the respective end wall such that said elastic clamping ring is deformed and securely engages the edge portion of said jacket against the counter-support member, said guide surfaces of said guide flange and corresponding guide groove cooperating to guide said form-stable clamping ring and said end wall into a radially and axially aligned relationship when clamped together.

11. A press roll as claimed in claim 10 further comprising a plurality of guide bolts each having a head and a shank, said head being adjacent to said end wall and said shank extending through said end wall and being secured to said form-stable clamping ring such that said form-stable clamping ring is retained adjacent to said elastic clamping ring when said securing members are loosened.

12. A press roll as claimed in claim 11 wherein said guide bolts have a length such that said head and said end wall define a gap therebetween when said form-stable clamping ring and said end wall are clamped together by said securing members.

13. A press roll as claimed in claim 11 wherein said guide bolts have a length such that said guide flange and said guide groove remain in engagement when said securing members are loosened.

14. A press roll as claimed in claim 12 wherein said gap is about 1–5 mm.

15. A press roll as claimed in claim 10 wherein said securing members comprise clamping bolts extending through said end wall and threadably engaging said form-stable clamping ring.

16. A press roll for an extended nip press in a papermaking machine, said press roll comprising:

at least one central support shaft;

a tubular flexible jacket, said jacket having a liquid-impervious outer surface and a pair of opposed edge portions;

a pair of end walls supported on said shaft;

a counter-support member connected to a peripherally outer portion of each of said end walls;

an elastic clamping ring supported on each of said end walls in a position radially spaced from the respective counter-support member, each of said opposed edge portions of said jacket being positioned between a respective elastic clamping ring and counter-support member;

a substantially rigid form-stable clamping ring adjacent to each of said elastic clamping rings;

a plurality of securing members for urging each form-stable clamping ring into clamping engagement with the respective end wall such that said elastic clamping ring is deformed and securely engages the edge portion of said jacket against the counter-support member; and a plurality of substantially rigid distance elements which are at least partially between each form-stable clamping ring and the respective end wall to prevent further deformation of said elastic clamping ring when said form-stable clamping ring is urged against the respective end wall to a predetermined degree.

17. A press roll as claimed in claim 16 wherein said distance elements further comprise a plurality of stop bolts each secured to said end wall and having an end adjacent to said form-stable clamping ring.

18. A press roll as claimed in claim 17 further comprising spacing washers for adjusting the position of the ends of said stop bolts.

* * * * *

UNITED STATES PATENT AND TRADEMARK OFFICE
CERTIFICATE OF CORRECTION

PATENT NO. : 5,904,813

DATED : May 18, 1999

INVENTOR(S) : Bengtsson et al.

It is certified that error appears in the above-identified patent and that said Letters Patent is hereby corrected as shown below:

On the Title page, item [73], in the Assignee's address, "Australia" should read --Sweden--.

Signed and Sealed this

Fifth Day of October, 1999

*Attest:*

Q. TODD DICKINSON

*Attesting Officer*     *Acting Commissioner of Patents and Trademarks*